| (12) | United States Patent | (10) Patent No.: | US 12,122,547 B2 |
|---|---|---|---|
| | Karlsson et al. | (45) Date of Patent: | Oct. 22, 2024 |

(54) INDUCTION HEAT SEALING DEVICE AND A METHOD FOR TRANSVERSALLY SEAL A TUBE OF PACKAGING MATERIAL

(71) Applicant: Tetra Laval Holdings & Finance S.A., Pully (CH)

(72) Inventors: Per Karlsson, Limhamn (SE); Patrik Palmquist, Lomma (SE); Magnus Lindvall, Lund (SE); Max Melin, Staffanstorp (SE); Håkan Andersson, Åkarp (SE); Karl Israelsson, Malmö (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 350 days.

(21) Appl. No.: 17/310,399

(22) PCT Filed: Jan. 31, 2020

(86) PCT No.: PCT/EP2020/052444
§ 371 (c)(1),
(2) Date: Jul. 30, 2021

(87) PCT Pub. No.: WO2020/161018
PCT Pub. Date: Aug. 13, 2020

(65) Prior Publication Data
US 2022/0127031 A1 Apr. 28, 2022

(30) Foreign Application Priority Data
Feb. 5, 2019 (EP) ..................................... 19155474

(51) Int. Cl.
*B65B 51/30* (2006.01)
*B29C 65/00* (2006.01)
(Continued)

(52) U.S. Cl.
CPC .......... *B65B 51/30* (2013.01); *B29C 66/1122* (2013.01); *B29C 66/4312* (2013.01);
(Continued)

(58) Field of Classification Search
CPC ......... B65B 51/30; B65B 51/227; B65B 9/06; B65B 9/08; B29C 66/4312
(Continued)

(56) References Cited

U.S. PATENT DOCUMENTS 2,899,875 A 8/1959 Leasure
3,408,242 A 10/1968 Rochla
(Continued)

FOREIGN PATENT DOCUMENTS

CH 676958 A5 3/1991
CN 1688483 10/2005
(Continued)

OTHER PUBLICATIONS

Communication Under Rule 71(3) in European Application 19177036.1, dated Sep. 11, 2020, in 6 pages.
(Continued)

*Primary Examiner* — Joshua E Rodden
(74) *Attorney, Agent, or Firm* — Knobbe, Martens, Olson & Bear, LLP (57) ABSTRACT

An induction heat sealing device for providing a transversal sealing of a tube of packaging material, said induction heat sealing device including a main body including a first and a second sealing surface arranged to face the packaging material during a sealing state, a recess provided in the main body for receiving a knife during a cutting state, wherein the first and second sealing surface are placed on opposite sides of the recess, and an electric conductor arrangement, provided in the main body, for inducing eddy currents in the packaging material during the sealing state, wherein at least part (Continued)

of the first and second sealing surface are inclined and provided with a first and a second top section, respectively, such that particles in a product held inside the tube are pushed away from a sealing band of the tube as the sealing band is pressed toward the first and second top section.

18 Claims, 5 Drawing Sheets

(51) Int. Cl.
  *B65B 9/08* (2012.01)
  *B65B 51/22* (2006.01)
(52) U.S. Cl.
  CPC .............. *B29C 66/849* (2013.01); *B65B 9/08* (2013.01); *B65B 51/227* (2013.01)
(58) Field of Classification Search
  USPC .......................................................... 53/451
  See application file for complete search history.

(56) References Cited

U.S. PATENT DOCUMENTS

| | | | |
|---|---|---|---|
| 3,466,841 A | 9/1969 | Rausing | |
| 3,572,004 A * | 3/1971 | Carmichael | B65B 53/063 |
| | | | 53/48.6 |
| 3,580,788 A | 5/1971 | Gustafson | |
| 3,721,534 A | 3/1973 | Kubick | |
| 3,808,074 A | 4/1974 | Smith et al. | |
| 3,854,874 A | 12/1974 | Loliger et al. | |
| 3,864,186 A | 2/1975 | Balla | |
| 3,884,746 A | 5/1975 | Loliger et al. | |
| 3,890,125 A | 6/1975 | Schoeck | |
| 4,169,004 A | 9/1979 | Kock et al. | |
| 4,506,125 A | 3/1985 | Smets | |
| 4,637,199 A * | 1/1987 | Steck | B29C 66/72321 |
| | | | 53/DIG. 2 |
| 4,704,509 A * | 11/1987 | Hilmersson | B29C 66/4312 |
| | | | 219/673 |
| 4,721,242 A | 1/1988 | Reil | |
| 4,757,175 A | 7/1988 | Mohr et al. | |
| 4,776,980 A | 10/1988 | Ruffini | |
| 4,784,697 A | 11/1988 | Bordini | |
| 4,808,326 A | 2/1989 | Tanino et al. | |
| 4,809,485 A | 3/1989 | Nielsen | |
| 4,817,366 A * | 4/1989 | Konzal | B29C 66/9292 |
| | | | 53/551 |
| 5,044,140 A | 9/1991 | Iwano | |
| 5,200,587 A | 4/1993 | Fang | |
| 5,250,140 A | 10/1993 | Hayashi et al. | |
| 5,260,535 A | 11/1993 | Holmström et al. | |
| 5,286,941 A | 2/1994 | Bel | |
| 5,418,069 A | 5/1995 | Learman | |
| 5,418,811 A | 5/1995 | Ruffini et al. | |
| 5,518,578 A | 5/1996 | Persells | |
| 5,588,019 A | 12/1996 | Ruffini et al. | |
| 5,649,407 A | 7/1997 | Blomqvist | |
| 5,678,392 A * | 10/1997 | Konno | B29C 66/8122 |
| | | | 53/551 |
| 5,714,033 A | 2/1998 | Hayashi et al. | |
| 5,753,067 A * | 5/1998 | Fukuda | B29C 66/8491 |
| | | | 53/374.6 |
| 5,889,263 A | 3/1999 | Andersson | |
| 5,968,399 A | 10/1999 | Selberg | |
| 6,167,681 B1 | 1/2001 | Yano et al. | |
| 6,216,420 B1 * | 4/2001 | Mazzetto | B65B 51/303 |
| | | | 53/375.9 |
| 6,367,230 B1 * | 4/2002 | Fukuda | B29C 65/18 |
| | | | 53/551 |
| 6,430,899 B1 | 8/2002 | Cicha | |
| 6,503,963 B2 | 1/2003 | Toyoda et al. | |
| 6,588,174 B2 | 7/2003 | Yamamoto | |
| 6,837,025 B2 | 1/2005 | Kume | |
| 6,877,295 B1 * | 4/2005 | Benedetti | B29C 66/849 |
| | | | 53/374.6 |
| 7,002,117 B2 | 2/2006 | Thomasset | |
| 7,003,934 B1 | 2/2006 | Yano | |
| 7,617,658 B2 * | 11/2009 | Nemkov | B65B 51/30 |
| | | | 53/DIG. 2 |
| 7,827,768 B2 | 11/2010 | Rosberg et al. | |
| 8,572,936 B2 | 11/2013 | Mancin et al. | |
| 8,707,661 B2 | 4/2014 | Kiinoshita et al. | |
| 8,707,662 B2 | 4/2014 | Borsari et al. | |
| 8,839,597 B2 * | 9/2014 | Babini | B29C 66/232 |
| | | | 53/374.6 |
| 8,938,938 B2 | 1/2015 | Konno et al. | |
| 8,943,786 B2 | 2/2015 | Konno et al. | |
| 9,174,754 B2 * | 11/2015 | Palmquist | B65B 51/303 |
| 9,238,515 B2 | 1/2016 | Persson et al. | |
| 9,352,869 B2 | 5/2016 | Babini et al. | |
| 9,545,751 B2 | 1/2017 | Hull | |
| 9,637,260 B2 | 5/2017 | Ghirardello et al. | |
| 10,160,162 B2 | 12/2018 | Bierlein et al. | |
| 10,350,829 B2 | 7/2019 | Sandberg et al. | |
| 10,350,832 B2 | 7/2019 | Karlsson et al. | |
| 10,358,243 B2 | 7/2019 | Israelsson et al. | |
| 10,414,098 B2 | 9/2019 | Aurand et al. | |
| 10,486,839 B2 | 11/2019 | Kogure et al. | |
| 10,773,846 B2 | 9/2020 | Gentili et al. | |
| 10,875,675 B2 | 12/2020 | Benedetti et al. | |
| 10,919,238 B2 | 2/2021 | Lancelotti et al. | |
| 10,994,495 B2 * | 5/2021 | Israelsson | B29C 66/849 |
| 2001/0047641 A1 | 12/2001 | Kume et al. | |
| 2002/0047009 A1 | 4/2002 | Flugstad et al. | |
| 2002/0108705 A1 | 8/2002 | Kume et al. | |
| 2002/0139084 A1 | 10/2002 | Tobolka | |
| 2003/0116886 A1 | 6/2003 | Nakazawa | |
| 2003/0230941 A1 | 12/2003 | Jacobs | |
| 2004/0045635 A1 | 3/2004 | Bandyopadhyay et al. | |
| 2004/0060928 A1 | 4/2004 | Balla | |
| 2004/0182046 A1 * | 9/2004 | Babini | B29C 66/3472 |
| | | | 53/374.5 |
| 2005/0076612 A1 | 4/2005 | Andersson et al. | |
| 2005/0241277 A1 | 11/2005 | Yano et al. | |
| 2006/0124626 A1 | 6/2006 | Kupfer et al. | |
| 2006/0154052 A1 | 7/2006 | Waffenschmidt et al. | |
| 2007/0251196 A1 | 11/2007 | Shokri et al. | |
| 2008/0092492 A1 * | 4/2008 | Konno | B29C 66/72321 |
| | | | 53/553 |
| 2009/0101286 A1 | 4/2009 | Sumeer | |
| 2009/0223173 A1 | 9/2009 | Rapparini | |
| 2010/0025391 A1 | 2/2010 | Palombini et al. | |
| 2010/0155390 A1 | 6/2010 | Hirota | |
| 2010/0180545 A1 * | 7/2010 | Palmquist | B29C 66/8167 |
| | | | 53/285 |
| 2010/0243155 A1 | 9/2010 | Andrews | |
| 2011/0030315 A1 | 2/2011 | Mancin | |
| 2011/0094672 A1 | 4/2011 | Wijk et al. | |
| 2011/0225929 A1 | 9/2011 | Donati et al. | |
| 2013/0119044 A1 | 5/2013 | Gynnild | |
| 2013/0063556 A1 | 10/2013 | Babini et al. | |
| 2013/0263556 A1 * | 10/2013 | Babini | B65B 51/306 |
| | | | 53/370.7 |
| 2015/0266603 A1 | 9/2015 | Aul et al. | |
| 2016/0221250 A1 | 8/2016 | Alexandersson et al. | |
| 2016/0229118 A1 | 8/2016 | Palmquist et al. | |
| 2016/0297121 A1 * | 10/2016 | Palmquist | B29C 65/368 |
| 2017/0182702 A1 | 6/2017 | Mach et al. | |
| 2017/0240309 A1 * | 8/2017 | Rubini | B29C 65/368 |
| 2018/0243996 A1 | 8/2018 | Bates et al. | |
| 2018/0250888 A1 | 9/2018 | Mach | |
| 2018/0272620 A1 | 9/2018 | Persson | |
| 2019/0152161 A1 | 5/2019 | Palmquist et al. | |
| 2020/0101678 A1 | 4/2020 | Keikhaee et al. | |
| 2020/0148406 A1 | 5/2020 | Svard et al. | |
| 2021/0245902 A1 | 8/2021 | Donati | |
| 2021/0331426 A1 | 10/2021 | Sanibondi et al. | |
| 2022/0048657 A1 | 2/2022 | Sanibondi et al. | |

(56) References Cited

U.S. PATENT DOCUMENTS

| | | | | |
|---|---|---|---|---|
| 2023/0391018 | A1* | 12/2023 | Andersson | B29C 66/71 |
| 2024/0017502 | A1* | 1/2024 | Andersson | B29C 65/3684 |

FOREIGN PATENT DOCUMENTS

| | | |
|---|---|---|
| CN | 102181156 | 9/2011 |
| CN | 103501982 | 1/2014 |
| CN | 105073368 | 11/2015 |
| CN | 107406160 | 11/2017 |
| DE | 19815439 | 10/1999 |
| DE | 102015102860 | 9/2016 |
| EP | 0147833 | 7/1985 |
| EP | 0212490 | 3/1987 |
| EP | 0223517 | 5/1987 |
| EP | 0225392 | 6/1987 |
| EP | 0466271 | 1/1992 |
| EP | 0484998 | 5/1992 |
| EP | 0495699 | 7/1992 |
| EP | 0653899 | 5/1995 |
| EP | 0730946 | 9/1996 |
| EP | 0796718 | 9/1997 |
| EP | 0819607 | 1/1998 |
| EP | 0950608 | 10/1999 |
| EP | 1066951 | 1/2001 |
| EP | 1107358 | 6/2001 |
| EP | 1125844 | 8/2001 |
| EP | 0706945 | 10/2001 |
| EP | 1231149 | 8/2002 |
| EP | 1234771 | 8/2002 |
| EP | 1241098 | 9/2002 |
| EP | 1270182 | 1/2003 |
| EP | 1300340 | 4/2003 |
| EP | 1334911 | 8/2003 |
| EP | 1535843 | 6/2005 |
| EP | 1541641 | 6/2005 |
| EP | 3053834 | 8/2005 |
| EP | 1413520 | 8/2006 |
| EP | 1790572 | 5/2007 |
| EP | 2008795 | 12/2008 |
| EP | 2026630 | 2/2009 |
| EP | 2236270 | 10/2010 |
| EP | 2343242 | 7/2011 |
| EP | 2468480 | 6/2012 |
| EP | 20695816 | 2/2014 |
| EP | 2781325 | 9/2014 |
| EP | 3000584 | 3/2016 |
| EP | 3241667 | 11/2017 |
| EP | 3254979 | 12/2017 |
| FR | 1433873 | 4/1966 |
| FR | 2073137 | 9/1971 |
| FR | 2776616 | 10/1999 |
| GB | 789981 | 7/2011 |
| GB | 2506681 | 4/2014 |
| JP | S57148619 | 9/1982 |
| JP | S 63-23900 B | 5/1988 |
| JP | S63-187591 | 8/1988 |
| JP | S63-258729 | 10/1988 |
| JP | H04-6025 | 1/1992 |
| JP | H 04-72141 A | 3/1992 |
| JP | H04-154564 | 5/1992 |
| JP | H08-244728 | 9/1996 |
| JP | H09-077006 | 3/1997 |
| JP | H10-321361 | 12/1998 |
| JP | H11-43115 | 2/1999 |
| JP | H11-514319 | 12/1999 |
| JP | 2000-127198 | 5/2000 |
| JP | 2002-046703 A | 2/2002 |
| JP | 2002-234075 A | 8/2002 |
| JP | 2004-228043 | 8/2004 |
| JP | 2009-149365 | 7/2009 |
| JP | 2009-012354 | 11/2009 |
| JP | 2015-16894 | 1/2015 |
| RU | 2096280 C1 | 11/1997 |
| SE | 434240 | 7/1984 |
| SU | 1551588 A1 | 3/1990 |
| SU | 1413026 A1 | 7/1998 |
| WO | WO 1992/015182 | 9/1992 |
| WO | WO 1997/14547 | 4/1997 |
| WO | WO 1999/029574 | 6/1999 |
| WO | WO 2001/085827 | 11/2001 |
| WO | WO 2003/053626 | 7/2003 |
| WO | WO 2003/097332 | 11/2003 |
| WO | WO 2005/004560 | 1/2005 |
| WO | WO 2005/105579 | 11/2005 |
| WO | WO 2005/110855 | 11/2005 |
| WO | WO 2007/008131 | 1/2007 |
| WO | WO 2009/139129 | 11/2009 |
| WO | WO 2010/136756 | 12/2010 |
| WO | WO 2011/075055 | 6/2011 |
| WO | WO 2012/019925 | 2/2012 |
| WO | WO 2013/045254 | 4/2013 |
| WO | WO 2014/072477 | 5/2014 |
| WO | WO 2014/166765 | 10/2014 |
| WO | WO 2015/036222 | 3/2015 |
| WO | WO 2015/040173 | 3/2015 |
| WO | WO 2015/158502 | 10/2015 |
| WO | WO 2016/052689 | 4/2016 |
| WO | WO 2016/083212 | 6/2016 |
| WO | WO 2016/132986 | 8/2016 |
| WO | WO 2017/089186 | 6/2017 |
| WO | WO 2017/089187 | 6/2017 |

OTHER PUBLICATIONS

Davis, J.R, "Practical Design Guidelines for Surface Engineering" Chapter 8, Surface Engineering for Corrosion and I/Vear Resistance, ASM International, Mar. 2001; eISBN: 9781615030729, pISBN: 9780871707000; pp. 195-229.

International Search Report and Written Opinion for Application No. PCT/EP2015/056329, dated Sep. 5, 2014.

International Search Report for Application No. PCT/EP2016/077779 dated Feb. 27, 2017.

International Search Report and Written Opinion of the International Searching Authority for International Application No. PCT/EP2018/064106, mailed on Jun. 18, 2018, in 11 pages.

International Search Report and Written Opinion received in International Application No. PCT/EP2018/070595, dated Sep. 21, 2018, in 10 pages.

International Search Report and Written Opinion of PCT/EP2020/052444, Dated Mar. 19, 2020 in 12 pages.

Leschynsky et al "Layered Alloys for Effective Magnetic Flux Concentration in Induction Heating," Materials Science-Poland, vol. 25, No. 2, 2007.

\* cited by examiner

INDUCTION HEAT SEALING DEVICE AND A METHOD FOR TRANSVERSALLY SEAL A TUBE OF PACKAGING MATERIAL

TECHNICAL FIELD

The invention generally relates to induction heat sealing. More particularly, it is related to a device for providing transversal sealing of a tube of packaging material holding a liquid food product, and a method thereof.

BACKGROUND ART

Today it is well known to produce carton packages filled with liquid food products, e.g. Tetra Brik™ packages filled with milk. The Tetra Brik™ packaging machine is an example of a roll-fed packaging machine, sometimes also referred to as a roll-fed filling machine. In the roll-fed packaging machine a web of packaging material, provided to the packaging machine on a reel, is formed into a tube and a longitudinal sealing is provided. After having formed the tube and provided the longitudinal sealing, the tube is filled with product. From a lower end of the tube, transversal sealings are continuously made. In connection with making the transversal sealings, the lower end of the tube is cut off such that packages filled with liquid product are formed. These packages are thereafter transferred to a folding device that folds the packages into their final form by making use of pre-made folding lines, sometimes also referred to as weakening lines, provided in the packaging material.

Another type of packaging machine is so-called blanks-fed packaging machines. Unlike the roll-fed packaging machine, the packages are made one by one in the blanks-fed packaging machine. Another difference among the two is that the longitudinal sealing is not made in the packaging machine, but is pre-made. A blank is thus in this context to be seen as a sleeve-shaped piece of packaging material. In the blanks-fed packaging machine, the blank is erected, i.e. unfolded such that an inner space is formed. After being erected a closed end is formed by providing a transversal sealing in one end of the sleeve. In a next step product is filled into the sleeve and thereafter another end of the sleeve is closed by providing a transversal sealing such that a closed package is formed.

To make sure that the product is kept safely within the package, the transversal sealings should be made in a reliable manner. Technology for providing reliable transversal sealings has been used for many years, but since the requirements in terms of speed, e.g. number of packages produced per hour, different types of products to be filled into the packages, e.g. high-viscous products and products containing seed and other types of particles, service intervals etc. are continuously increasing, there is a need for improved transversal sealing technology.

SUMMARY

It is an object of the invention to at least partly overcome one or more of the above-identified limitations of the prior art. In particular, it is an object to provide an improved induction heat sealing device.

According to a first aspect it is provided an induction heat sealing device for providing a transversal sealing of a tube of packaging material, said induction heat sealing device comprising a main body comprising a first and a second sealing surface arranged to face the packaging material during a sealing state, a recess provided in the main body for receiving a knife during a cutting state, wherein the first and second sealing surface are placed on opposite sides of the recess, and an electric conductor arrangement, provided in the main body, for inducing eddy currents in the packaging material during the sealing state, wherein at least part of the first and second sealing surface are inclined and provided with a first and a second top section, respectively, such that particles in a product held inside the tube are pushed away from a sealing band of the tube as the first and second top section are pressed towards the sealing band.

The induction heat sealing device may further comprise a magnetic flux concentrator arrangement holding the electric conductor arrangement, wherein the magnetic flux concentrator arrangement is provided with one or several inclined magnetic flux concentrator top surfaces forming part of the first and second sealing surface.

The electronic conductor arrangement may be provided with one or several inclined electronic conductor arrangement top surfaces forming part of the first and second sealing surface.

At least part of the first and second sealing surface may be inclined such that a direction in which melted polymer in the packaging material is moved as the induction heat sealing device (300) is pressed towards the sealing band is controlled.

An inclination profile of the first and second sealing surface of the heat sealing device (300) may be adapted for a specific type of packaging material having a specific type of polymer in the polymer layer.

Further, an inclination profile of the first and second sealing surface of the heat sealing device may be adapted for a specific type of product comprising a specific type of particles.

Additionally, an inclination profile of the first and second sealing surface of the heat sealing device may be adapted for a specific type of dynamics of a filling machine.

According to a second aspect it is provided a transversal sealing system comprising the induction heat sealing device according to the first aspect, and a counter-pressure arrangement arranged opposite to the induction heat sealing device, wherein the induction heat sealing device and the counter-pressure arrangement is arranged, in operation, such that the tube can be fed between the two.

The counter-pressure arrangement may comprise a first and a second counter-pressure element provided with a first and a second pressure pad surface, respectively, wherein the first and second counter-pressure pad surfaces are convex-shaped.

A first pressure pad top section of the first convex-shaped pressure pad may be offset the first top section of the first sealing surface of the induction heat sealing device, and a second pressure pad top section of the second convex-shaped pressure pad may be offset the second top section of the first sealing surface of the induction heat sealing device.

According to a third aspect it is provided a method for transversally seal a tube of packaging material by using an induction heat sealing device comprising a main body comprising a first and a second sealing surface arranged to face the packaging material during a sealing state, a recess provided in the main body for receiving a knife during a cutting state, wherein the first and second sealing surface are placed on opposite sides of the recess, and an electric conductor arrangement, provided in the main body, for inducing eddy currents in the packaging material during the sealing state, wherein at least part of the first and second sealing surface are inclined and provided with a first and a second top section, respectively, and a counter-pressure arrangement arranged opposite to the induction heat sealing device, said method comprising:

placing the tube such that a sealing band of the tube is facing the induction heat sealing device and the counter-pressure arrangement;

moving the induction heat sealing device and the counter-pressure arrangement towards one another such that particles of the product held inside the tube is pushed away;

inducing eddy currents in the packaging material of the tube by using the induction heat sealing device;

pressing a first side and a second side of the tube towards one another such that the melted polymer in the polymer layer of the first and the second side of the tube attach to each other; and distributing the melted polymer using the inclined sealing surfaces of the induction heat sealing device such that a risk for insufficient sealing is reduced.

BRIEF DESCRIPTION OF THE DRAWINGS

Embodiments of the invention will now be described, by way of example, with reference to the accompanying schematic drawings, in which.

DETAILED DESCRIPTION

Figure 1:
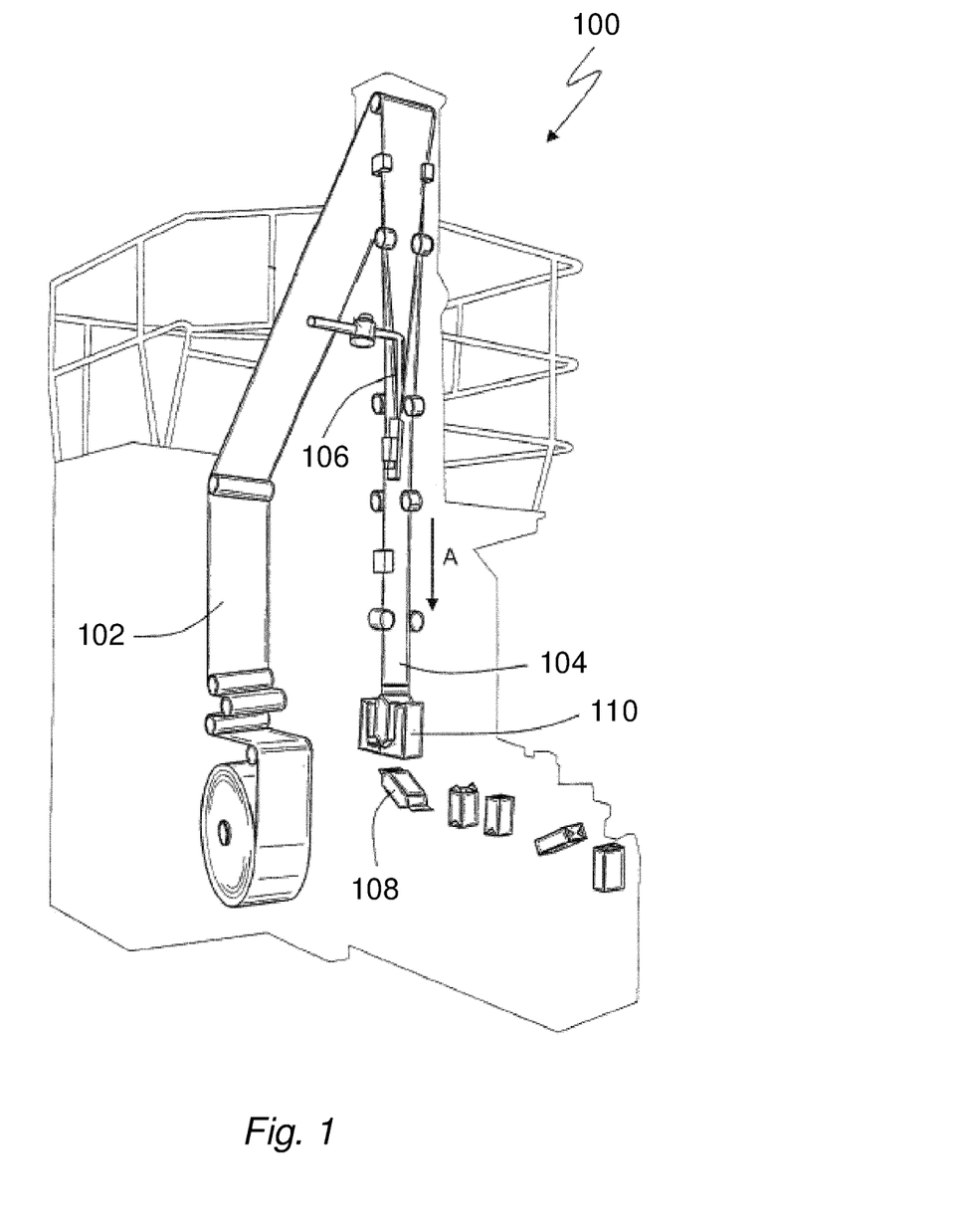
FIG. 1 is a general illustration of a roll-fed packaging machine.

FIG. 1 generally illustrates a packaging machine 100. In the illustrated example, the packaging machine 100 is a roll-fed carton packaging machine. The general principle of such a machine is that from a roll of packaging material a web 102 is formed. Although not illustrated, if needed in order to fulfill food safety regulations, the web 102 may be sterilized using a hydrogen peroxide bath, a Low Voltage Electron Beam (LVEB) device or any other apparatus capable of reducing a number of unwanted microorganisms. After sterilization, by using a longitudinal sealing device, the web 102 can be formed into a tube 104. When having formed the tube a product, for instance milk, can be fed into the tube 104 via a product pipe 106 placed at least partly inside the tube 104.

In order to form a package 108 from the tube 104 filled with product, a transversal sealing can be made in a lower end of the tube by using a sealing apparatus 110. Generally, the sealing apparatus 110 has two main functions providing the transversal sealing, i.e. welding two opposite sides of the tube together such that the product in a lower part of the tube, placed downward the sealing apparatus, is separated from the product in the tube placed upward the sealing apparatus, and cutting off the lower part of the tube such that the package 108 is formed. Alternatively, instead of providing the transversal sealing and cutting off the lower part in one and the same apparatus as illustrated, the step of cutting off the lower part may be made in a subsequent step by a different piece of equipment, or by the consumer if the packages are intended to be sold in a multi-pack.

Figure 2:
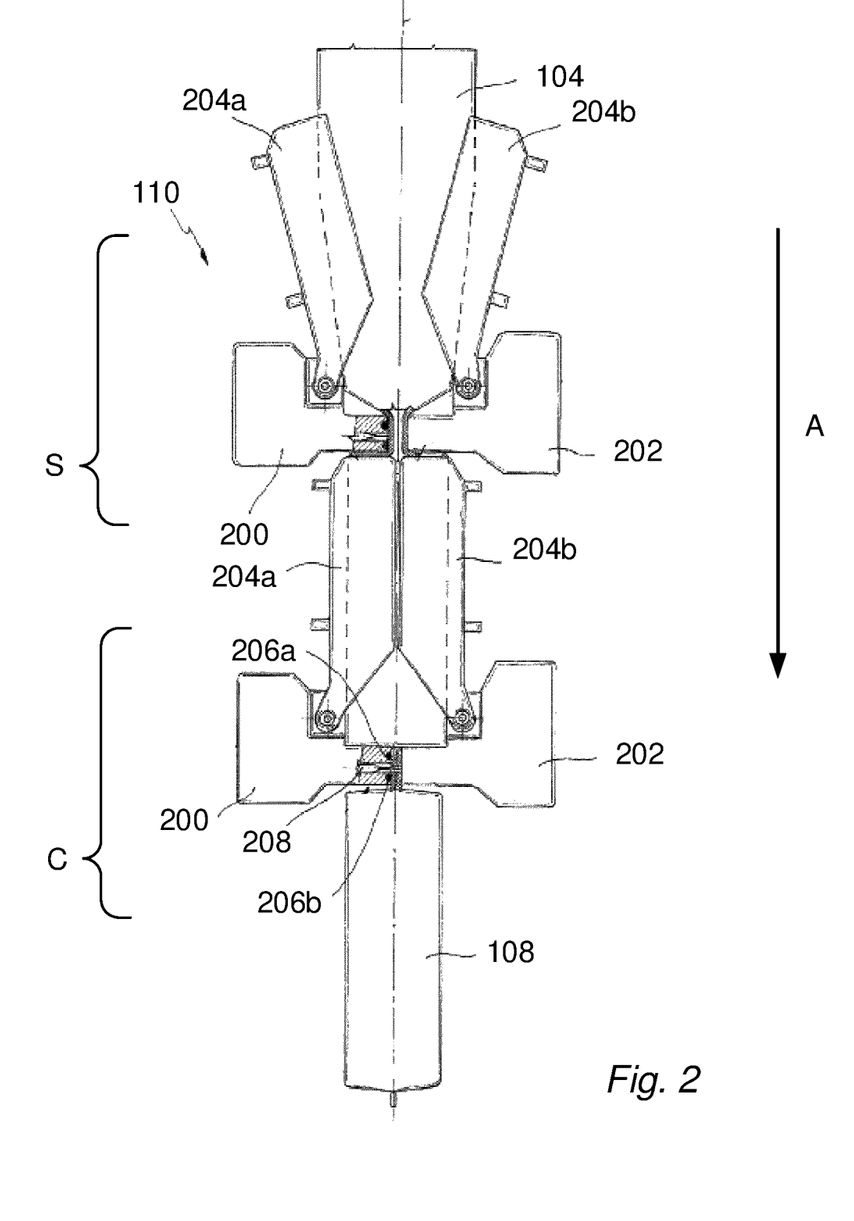
FIG. 2 is a more detailed view of a sealing apparatus used for providing transversal sealings.

In FIG. 2 a general principle of the sealing apparatus 110 is illustrated in further detail. The tube 104 can be fed from above since this provides for that product can be held inside the tube. In a first stage, a sealing stage S, a first jaw provided with a sealing device 200 and a second jaw provided with a counter pressure device 202 are moved towards each other such that two opposite sides of the tube 104 are pressed towards one another. In order to provide for the transversal sealing, heat can be provided by inducing eddy currents in the packaging material while pressing the two opposite sides together. The heat provides for that a polymer layer of the packaging material is melted, which in turn provides for the polymer layer can be used for making sure that the two opposite sides can attach to each other and stay together after the jaws are removed. In a subsequent step, herein referred to as a cutting stage C, the lower part of the tube 104 can be cut off such that the package 108 is formed. In order to increase a speed in which packages are formed, the jaws can be moved together with the tube 104 in a tube feeding direction A during the sealing stage S and the cutting stage C.

In order to provide for a more controlled forming process of the package 108 so-called volume forming flaps 204a, 204b can be used. More specifically, by using these the tube 104 having a round cross-section may be steered into a package 108 having a rectangular cross-section in a controlled manner.

The sealing device can be provided with two inductors, a first inductor 206a and a second inductor 206b. In the illustrated example, the first inductor 206a is arranged above the second inductor 206b. After having provided the transversal sealing a knife 208 can be used for cutting off the lower part of the tube and thus form the package 108. In this example, the knife 208 and the first and second inductors 206a, 206b are provided in the sealing device, but other arrangements are also possible. For instance, the knife may be provided on the other side of the tube, in the counter pressure device, or the cutting step may be performed by a separate device downstream the sealing device.

Figure 3:
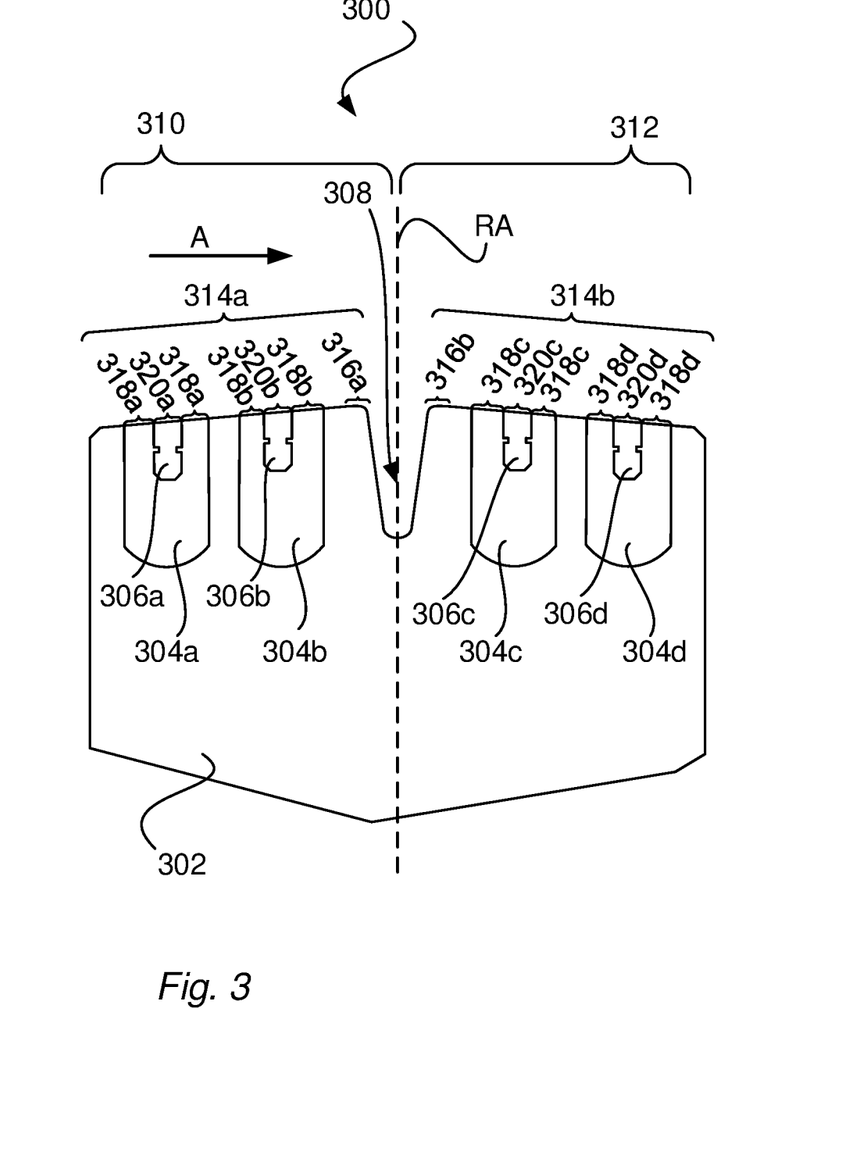
FIG. 3 illustrates a cross-sectional view of a heat induction sealing device.

In FIG. 3, by way of example, an induction heat sealing device 300 that may form part of the sealing apparatus 110 is illustrated in detail. More particularly, the induction heat sealing device 300 may be used as the sealing device 200 illustrated in FIG. 2.

The induction heat sealing device 300 can comprise a main body 302. In the main body 302 a magnetic flux concentrator arrangement 304a-d may be provided. A purpose of the magnetic flux concentrator arrangement 304a-d can be to direct the electromagnetic radiation formed by an electronic conductor arrangement 306a-d, that also can be comprised in the main body 302, towards the tube 102 of packaging material during the sealing stage S. The magnetic flux concentrator arrangement 304a-d can be made of different materials, such as plasto-ferrite or soft magnetic composite.

The induction heat sealing device 300 may be designed in different ways. In FIG. 3, a so-called twin coil inductor is illustrated by way of example. In the twin coil inductor, the electronic conductor arrangement 306a-d may comprise a first coil 306a-b and a second coil 306c-d, that is, one coil is provided on either side of a recess 308 configured to receive the knife during the cutting stage C. Another option, is a so-called single-coil inductor where one coil is provided and arranged such that part of the coil is provided on one side of the recess 308 and another part of the coil is provided on the other side of the recess 308. Put differently, a first inductor 310 and a second inductor 312, representing a first part of the main body 302 on one side of the recess 308 and a second part of the main body 302 on the other side of recess 308, respectively, may share a single coil or may be provided with one coil each, as illustrated in FIG. 3.

Further, as illustrated, the electronic conductor arrangement 306a-d may be held by the magnetic flux concentrator arrangement 304a-d such that the electronic conductor arrangement 306a-d forms part of an outer surface of the main body 302. Another option, even though not illustrated, is that the electronic conductor arrangement 306a-d is held completely within the magnetic flux concentrator arrangement 304a-d such that the electronic conductor arrangement 306a-d does not form part of the outer surface of the main body 302. Still an option is to have a surface cover, not illustrated, such that neither the magnetic flux concentrator arrangement 304a-d nor the electronic conductor arrangement 306a-d form part of the outer surface.

A first and second sealing surface 314a, 314b of the first and second inductor 310, 312, respectively, may be inclined as illustrated in FIG. 3. There are several advantages with having the first and second sealing surfaces 314a, 314b inclined. First, during the sealing stage S, particles in the food product in the tube 104 may be pushed out from a sealing band of the tube 104, that is, a section of the tube 104 that is to be formed into a transversal sealing, in a more controlled manner compared to when having flat-surfaced inductors. More particularly, an effect of having the first and second sealing surfaces 314a, 314b inclined is that a pressure gradient can successively be built up inside the tube 104. Since different products may differ in terms of e.g. viscosity and in that they comprise particles or not, and if comprising particles that these may have different properties, different products may require different measures for avoiding product residues in the sealing band. By customizing an inclination profile, that is how the sealing surfaces 314a, 314b are inclined, based on the product held inside the tube 104, the pressure gradient build-up can be optimized for the product, implying an even further improved transversal sealing.

In addition to improving that product residues are adequately removed from the sealing band in the sealing stage S, having the sealing surfaces 314a, 314b inclined also has a positive effect on sealing quality. A pressure gradient is namely also formed in the polymer layer that is melted during the sealing stage S. This provides for that how melted polymer in the packaging material is moved can be controlled in a more precise manner compared to if using the flat-surfaced inductors. In turn, this may result in that a risk of having aggregations of melted polymer in the packaging material can be reduced. Put differently, the melted polymer can be distributed more efficiently. Another positive effect is that less polymer may be required for making reliable transversal sealing. Since how the melted polymer is distributed during the sealing stage S can be controlled in a more precise manner, this may imply that less polymer is required, which is advantageous from an environmental point of view as well as from a cost perspective.

In the example illustrated in FIG. 3, the first and second sealing surface 314a, 314b are provided with a first and second top section 316a, 316b, respectively. As illustrated, in this example the first and second top section 316a, 316b are placed next to the recess 308, but other placements of the first and second top section 316a, 316b are also possible. Further, as illustrated in FIG. 3, magnetic flux concentrator top surfaces 318a-d can be inclined and form part of the first and second sealing surface 314a, 314b. As illustrated, also electronic conductor arrangement top surfaces 320a-d may be inclined and form part of the sealing surface 314a, 314b.

Further, the first and second sealing surfaces 314a, 314b may be symmetrical with respect to a recess axis RA running through the recess 308.

Figure 4:
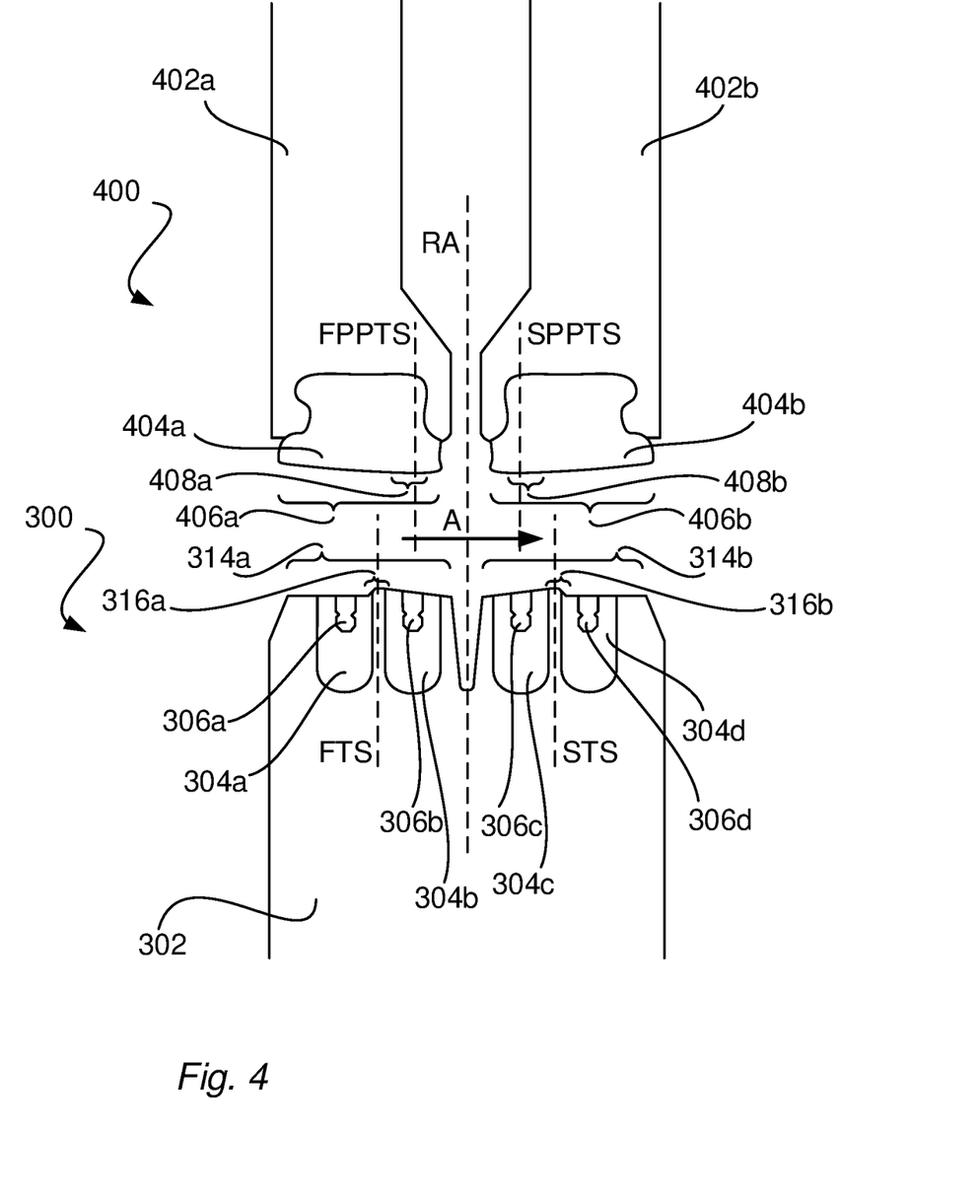
FIG. 4 illustrates a transversal sealing system.

FIG. 4 generally illustrates a transversal sealing system 400 comprising the induction heat sealing device 300 and a counter-pressure arrangement 402a, 402b in turn comprising a first and a second counter-pressure element 402a, 402b.

The induction heat sealing device 300 illustrated in FIG. 4 is different from the one illustrated in FIG. 3 in that the first and second top section 316a, 316b are placed in a mid-portion of the first and second sealing surfaces 314a, 314b, respectively, instead of next to the recess 308 as is the case in the example illustrated in FIG. 3. Further, the sealing surfaces 314a, 314b in the example illustrated in FIG. 4 is only inclined in part, that is, the sealing surfaces 314a, 314b comprise inclined sections and flat sections.

The first and second counter-pressure element 402a, 402b may comprise a first and second counter pressure pad 404a, 404b, respectively, which may for instance be made of rubber or other elastic material. The first and second counter pressure pad 404a, 404b can be provided with a first and a second counter-pressure pad surface 406a, 406b arranged to face the tube 104 during the sealing stage S. The first and second counter-pressure pad surface 406a, 406b can be convex-shaped and provided with a first and a second counter-pressure pad top section 408a, 408b, respectively.

As illustrated in FIG. 4, the first and second counter-pressure pad top section 408a, 408b may be offset with respect to the first and second top section 316a, 316b, herein illustrated by a first pressure pad top section FPPTS axis running through the first counter-pressure pad top section 408a, a second pressure pad top section SPPTS axis running through the second counter-pressure pad top section 408b, a first top section FTS axis running through the first top section 316a, and a second top section STS axis running through the second top section 316b. Even though not illustrated, it is also possible to have the first and second counter-pressure pad top section 408a, 408b aligned with respect to the first and second top section 316a, 316b.

Further, as presented above, the inclination profile of the first and second sealing surface 314a, 314b may adjusted to meet needs of a specific product, a specific packaging material, a specific type of sealing apparatus 110, a specific packaging machine 100 or a combination thereof. In addition, to even further improve sealing properties, also an inclination profile of the first and second counter-pressure pad surface 406a, 406b may be adjusted to meet the needs stated above.

In addition, the first and second counter-pressure element 402a, 402b may be shaped differently such that the first and second counter-pressure pad surface 406a, 406b have different inclination profiles. One reason for having these shaped differently is that the tube 104, placed upstream the transversal sealing system 400, provides a pressure caused by the food product held in the tube 104 down onto the transversal sealing system 400. By having the first and second counter-pressure element 402a, 402b, and optionally also, or instead, the first and second inductor 310, 312 shaped differently, the pressure caused by the food product can be compensated for.

Figure 5:
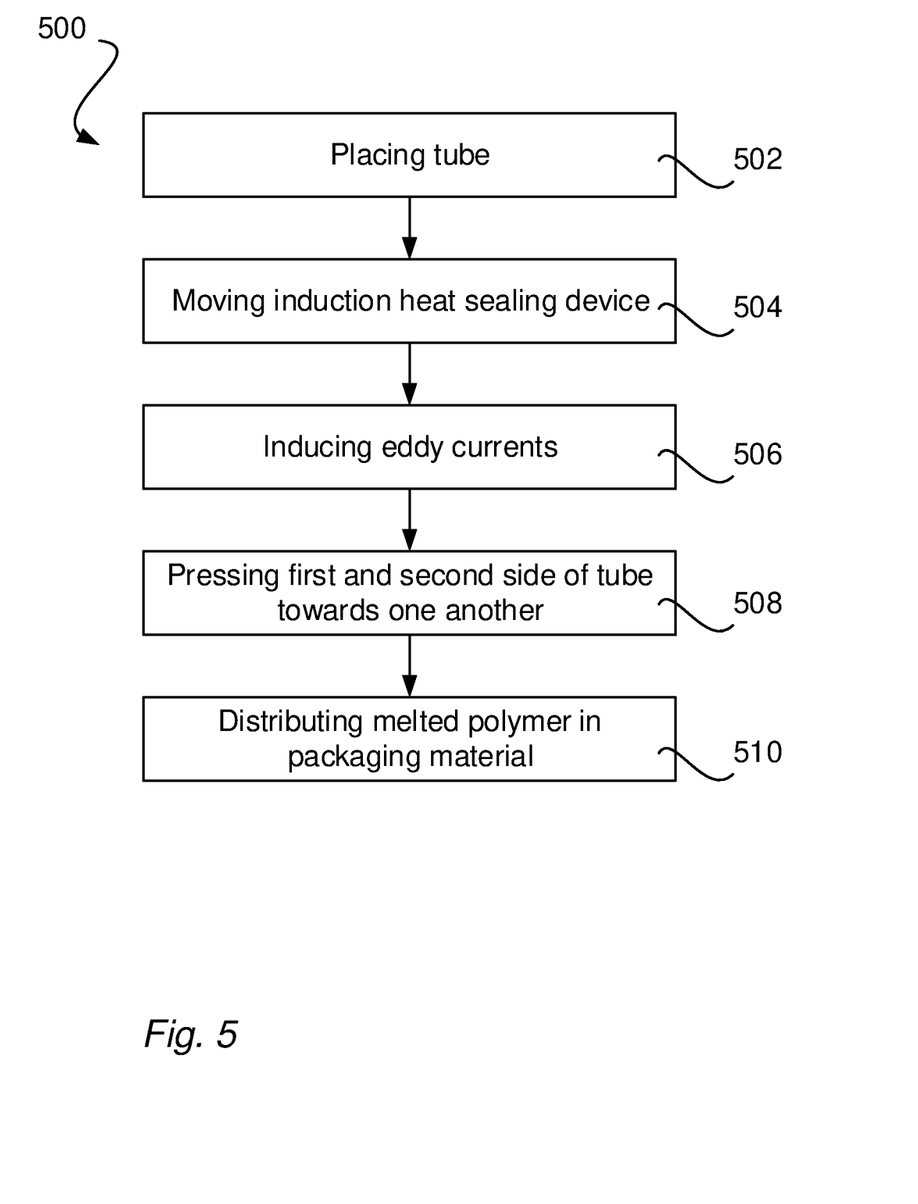
FIG. 5 illustrates a flow chart of a method for transversally seal a tube of packaging material.

FIG. 5 is a flow chart 500 illustrating a method for transversally seal the tube 104 of packaging material by using the induction heat sealing device 300. The method can comprise placing 502 the tube 104 such that the sealing band of the tube is facing the induction heat sealing device 300 and the counter-pressure arrangement 402a, 402b, moving 504 the induction heat sealing device 300 and the counter-pressure arrangement 402a, 402b towards one another such that particles of the product held inside the tube is pushed away, inducing 506 eddy currents in the packaging material of the tube by using the induction heat sealing device 300, pressing 508 the first side and the second side of the tube 104 towards one another such that the melted polymer in the polymer layer of the first and the second side of the tube attach to each other, and distributing 510 the melted polymer using the inclined sealing surfaces of the induction heat sealing device 300 such that a risk for insufficient sealing is reduced.

From the description above follows that, although various embodiments of the invention have been described and shown, the invention is not restricted thereto, but may also be embodied in other ways within the scope of the subject-matter defined in the following claims.

The invention claimed is:

1. An induction heat sealing device for providing a transversal sealing of a tube of packaging material, said induction heat sealing device comprising:
    a main body comprising a first and a second sealing surface arranged to face the packaging material during a sealing state,
    a recess provided in the main body for receiving a knife during a cutting state, wherein the first and second sealing surface are placed on opposite sides of the recess,
    an electric conductor arrangement, provided in the main body, the electric conductor arrangement configured to induce eddy currents in the packaging material during the sealing state, and
    a magnetic flux concentrator arrangement positioned around and holding the electric conductor arrangement,
    wherein the first and second sealing surface are inclined and provided with a first and a second top section, respectively, such that particles in a product held inside the tube are pushed away from a sealing band of the tube as the first and second top section are pressed towards the sealing band.

2. The induction heat sealing device according to claim 1, wherein a top surface of the magnetic flux concentrator arrangement forms part of the first and second sealing surface.

3. The induction heat sealing device according to claim 1, wherein the electric conductor arrangement is provided with one or more inclined electric conductor arrangement top surfaces forming part of the first and second sealing surface.

4. The induction heat sealing device according to claim 1, wherein at least part of the first and second sealing surface are inclined to control a direction in which melted polymer in the packaging material is moved while the induction heat sealing device is pressed towards the sealing band.

5. The induction heat sealing device according to claim 1, wherein an inclination profile of the first and second sealing surface of the heat sealing device is selected based on a polymer in a polymer layer of the packaging material.

6. The induction heat sealing device according to claim 1, wherein an inclination profile of the first and second sealing surface of the heat sealing device is based on a type of the particles in the product.

7. The induction heat sealing device according to claim 1, wherein an inclination profile of the first and second sealing surface of the heat sealing device is selected based on dynamics of a filling machine.

8. A transversal sealing system comprising:
    the induction heat sealing device according to claim 1, and
    a counter-pressure arrangement arranged opposite to the induction heat sealing device,
    wherein the induction heat sealing device and the counter-pressure arrangement is arranged, in operation, such that the tube can be fed between the two.

9. The transversal sealing system according to claim 8, wherein the counter-pressure arrangement comprises a first and a second counter-pressure element provided with a first and a second pressure pad surface, respectively, wherein the first and second counter-pressure pad surfaces are convex-shaped.

10. The transversal sealing system according to claim 9, wherein a first pressure pad top section of the first convex-shaped pressure pad is offset the first top section of the first sealing surface of the induction heat sealing device, and a second pressure pad top section of the second convex-shaped pressure pad is offset the second top section of the first sealing surface of the induction heat sealing device.

11. A method for transversally sealing a tube of packaging material by using an induction heat sealing device comprising a main body comprising a first and a second sealing surface arranged to face the packaging material during a sealing state, a recess provided in the main body for receiving a knife during a cutting state, wherein the first and second sealing surface are placed on opposite sides of the recess, an electric conductor arrangement, provided in the main body, for inducing eddy currents in the packaging material during the sealing state, and a magnetic flux concentrator arrangement positioned around and holding the electric conductor arrangement, wherein the first and second sealing surface are inclined and provided with a first and a second top section, respectively, and a counter-pressure arrangement arranged opposite to the induction heat sealing device, said method comprising:
    placing the tube such that a sealing band of the tube is facing the induction heat sealing device and the counter-pressure arrangement,
    moving the induction heat sealing device and the counter-pressure arrangement towards one another such that particles of a product held inside the tube is pushed away,
    inducing eddy currents in the packaging material of the tube by using the induction heat sealing device,
    pressing a first side and a second side of the tube towards one another such that a melted polymer in a polymer layer of the first and the second side of the tube attach to each other, and
    distributing the melted polymer using the inclined sealing surfaces of the induction heat sealing device such that a risk for insufficient sealing is reduced.

12. The induction heat sealing device according to claim 1, wherein the magnetic flux concentrator arrangement is configured to direct electromagnetic radiation formed by the electric conductor arrangement towards the packaging material during the sealing state.

13. The induction heat sealing device according to claim 1, wherein the magnetic flux concentrator comprises plasto-ferrite or a soft magnetic composite.

14. The transversal sealing system according to claim 8, wherein the magnetic flux concentrator arrangement is configured to direct electromagnetic radiation formed by the electric conductor arrangement towards the packaging material during the sealing state.

15. The transversal sealing system according to claim 8, wherein the magnetic flux concentrator comprises plasto-ferrite or a soft magnetic composite.

16. The method according to claim 11, wherein a top surface of the magnetic flux concentrator arrangement forms part of the first and second sealing surface.

17. The method according to claim 11, wherein the magnetic flux concentrator arrangement is configured to direct electromagnetic radiation formed by the electric conductor arrangement towards the packaging material during the sealing state.

18. The method according to claim 11, wherein the magnetic flux concentrator comprises plasto-ferrite or a soft magnetic composite.

* * * * *